United States Patent
Dhulipalla et al.

(10) Patent No.: US 10,104,498 B2
(45) Date of Patent: Oct. 16, 2018

(54) PROVIDING RUN TIME SIGNAL LOSS INSIGHTS TO USERS

(71) Applicant: CA, Inc., New York, NY (US)

(72) Inventors: Narendra Dhulipalla, Telangana (IN); Madhusudhan Ganda, Bangalore (IN); Sumit Gupta, Bangalore (IN); Ramanuja Charyulu, East Setauket, NY (US); Kiran Kumar B. S., Bangalore (IN); Swapnel Shrivastava, Bangalore (IN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/346,099

(22) Filed: Nov. 8, 2016

(65) Prior Publication Data

US 2018/0132060 A1    May 10, 2018

(51) Int. Cl.
| | |
|---|---|
| *H04W 4/00* | (2018.01) |
| *H04W 4/02* | (2018.01) |
| *H04L 12/26* | (2006.01) |
| *G01C 21/36* | (2006.01) |
| *H04W 4/029* | (2018.01) |

(52) U.S. Cl.
CPC ........ *H04W 4/023* (2013.01); *G01C 21/3676* (2013.01); *H04L 43/16* (2013.01); *H04W 4/029* (2018.02)

(58) Field of Classification Search
CPC ...... H04W 4/023; H04W 4/029; H04L 43/16; G01C 21/3676
See application file for complete search history.

(56) References Cited

U.S. PATENT DOCUMENTS

| | | | | |
|---|---|---|---|---|
| 6,125,278 | A * | 9/2000 | Wieczorek | H04W 28/26 455/437 |
| 8,594,061 | B2 * | 11/2013 | Kennedy | H04W 4/029 370/338 |
| 9,444,897 | B1 * | 9/2016 | Bostick | H04L 67/18 |
| 2008/0117866 | A1 * | 5/2008 | Claussen | H04W 36/04 370/329 |
| 2008/0268816 | A1 * | 10/2008 | Wormald | H04L 67/24 455/412.2 |
| 2013/0122934 | A1 * | 5/2013 | Branch | H04W 4/21 455/456.3 |
| 2013/0143553 | A1 * | 6/2013 | Beattie, Jr. | H04W 24/08 455/434 |
| 2015/0056960 | A1 * | 2/2015 | Egner | H04W 12/08 455/411 |
| 2015/0106312 | A1 * | 4/2015 | Chen | H04W 4/028 706/21 |
| 2015/0133143 | A1 * | 5/2015 | Huang | H04W 4/028 455/456.1 |

(Continued)

*Primary Examiner* — Khai M Nguyen
(74) *Attorney, Agent, or Firm* — Baker Botts L.L.P.

(57) ABSTRACT

A method includes determining, using a processor, a predicted location of a particular mobile device at a future time based on location information received from the particular mobile device. The method also includes determining, using the processor, a predicted signal strength of the particular mobile device based on a signal catalog and the predicted location of the particular mobile device. The method further includes transmitting, using the processor, the predicted signal strength to the particular mobile device.

20 Claims, 5 Drawing Sheets

(56) References Cited

U.S. PATENT DOCUMENTS

| | | | |
|---|---|---|---|
| 2015/0304929 A1* | 10/2015 | Hua | H04W 36/32 |
| | | | 455/436 |
| 2015/0358834 A1* | 12/2015 | Cronin | H04W 24/02 |
| | | | 455/452.1 |
| 2016/0057639 A1* | 2/2016 | Smith | H04W 4/029 |
| | | | 455/423 |
| 2016/0373891 A1* | 12/2016 | Ramer | H04W 4/02 |

* cited by examiner

PROVIDING RUN TIME SIGNAL LOSS INSIGHTS TO USERS

BACKGROUND

The present disclosure relates to mobile phone signal service, and, more specifically, to systems and methods for determining and predicting areas of differing signal strength.

Connection issues affect all users of mobile devices across countries irrespective of service provider and location. As mobile devices continue to become more prevalent in society, users of such devices will continue to have connection issues in areas with little to no service. Countless business and personal calls have lost connection with no warning due to users entering these areas. Mobile device users are unaware of areas where signal coverage is weak and where it is strong.

Accordingly, there is a need for a system that provides a user with actionable information regarding areas of weak and strong signal for mobile devices. The present disclosure describes a system and method for determining a signal catalog indicative of reported signal strength at each of multiple locations based on signal strength data and corresponding location information received from multiple mobile devices. Using this signal catalog, some systems and methods of the present disclosure may convey to a user of a mobile device areas of strong or weak signal. Furthermore, systems and methods of the present disclosure may transmit an indication to the user of the mobile device that he or she is about to enter into an area of weak signal.

BRIEF SUMMARY

According to an aspect of the present disclosure, a method may include several processes. In particular, the method may include determining a signal catalog indicative of reported signal strength at each of a plurality of locations based on signal strength data and corresponding location information received from a plurality of mobile devices. The method also includes determining a predicted location of a particular mobile device at a future time based on location information received from the particular mobile device and determining a predicted signal strength of the particular mobile device based on the signal catalog and the predicted location of the particular mobile device. The method also includes transmitting the predicted signal strength to the particular mobile device.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements of a non-limiting embodiment of the present disclosure.

DETAILED DESCRIPTION

Figure 1:
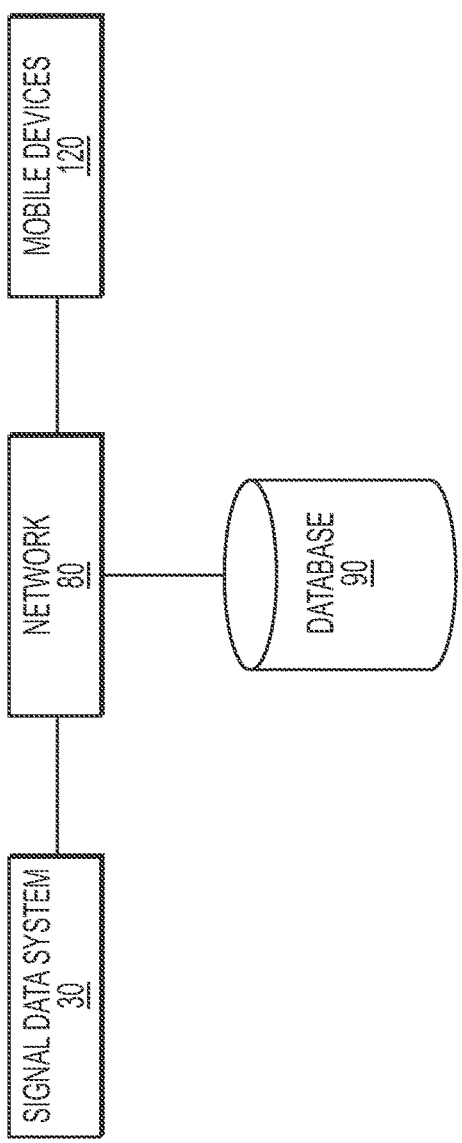
FIG. 1 is a schematic representation of a signal data system ecosystem of a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Each activity in the present disclosure may be executed on one, some, or all of one or more processors. In some non-limiting embodiments of the present disclosure, difference activities may be executed on different processors.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to signal service and mobile devices, systems and methods disclosed herein may be related to any field. Moreover, certain examples disclosed herein may be described with respect to airline services, commercial delivery services, consumer electronics, or any other field that may involve signal strength components. Certain embodiments described in the present disclosure are merely provided as example implementations of the processes described herein.

Poor signal service for mobile phones is an issue across the globe irrespective of service provider. During a call, users may have little or no warning before they lose signal and ultimately the connection. Systems and methods disclosed herein may use signal and geo-location technologies to track and designate locations based on signal strength data that may be crowd sourced from a plurality of mobile devices.

The teachings of the present disclosure may reference specific example "objects." For example, an "object" can include a car, truck, boat, plane, rail vehicle, transport, and the like. In certain embodiments, "object" may refer to a smartphone, GPS device, satellite communication terminal, radio communication terminal, or any other device capable of estimating or tracking location or motion data. For example, a mobile device may be equipped with an accelerometer and GPS system for interfacing with applications or websites. Any movable or moving object with such capabilities is contemplated within the scope of the present disclosure.

In a first example, systems and methods disclosed herein may notify users when their mobile device is nearing an area that has reported weak signal strength based on crowd sourced information. For example, systems and methods disclosed herein may determine that several users may have entered the area and experienced reduced signal strength. Some non-limiting embodiments of the present disclosure may receive signal strength data and corresponding location information from multiple mobile device users. Using this data, systems and methods disclosed herein may warn a mobile device user heading for an area of historically weak signal strength. Other examples may include transmitting predicted signal strength to the mobile device user or suggesting a heading to increase signal strength based on the location of the mobile device user.

In a second example, non-limiting embodiments of the present disclosure may receive a request from a mobile device user for a signal strength report in a designated location. Predicted signal strength may be determined based on signal strength data and corresponding location information received from a plurality of mobile devices over a period of time. In response to the request, non-limiting embodiments of the present disclosure may transmit predicted signal strength in the requested area based on an average of the data received from the plurality of mobile devices. The predicted signal strength may be displayed via a Graphical User Interface (GUI) on any type of device. In addition, predicted signal strength data may be overlaid on a map and displayed on the GUI of a mobile device.

In a third example, systems and methods disclosed herein may leverage reported signal strength at a plurality of locations received from multiple mobile devices to generate a signal map by charting such data on a general reference map. This tool may be accessible on a mobile device via a local database of the mobile device or via a network or the cloud. In a non-limiting embodiment, a user may view the data overlaid on a general reference map to determine an area of robust signal and accordingly adjust his or her heading.

Certain implementations of the present disclosure may utilize GPS-enabled, Wi-Fi/Cellular transmitters that are attached to a plurality of objects in motion, and such transmitters may be used to track the relative positions of each of the plurality of objects in motion. Such objects may include mobile devices such as cell phones and laptops, as well as enabled vehicles.

Referring now to FIG. 1, a signal data system environment of a non-limiting embodiment of the present disclosure is illustrated. A signal data system 30 may be connected to a database 90 and mobile devices 120 via a network 80.

Network 80 may comprise one or more entities, which may be public, private, or community based. Network 80 may permit the exchange of information and services among users/entities that are connected to such network 80. In certain configurations, network 80 may be a local area network, such as an intranet. Further, network 80 may be a closed and/or private network/cloud in certain configurations, and an open network/cloud in other configurations. Network 80 may facilitate wired or wireless communications of information and provisioning of services among users that are connected to network 80.

Network 80 may comprise one or more clouds, which may be public clouds, private clouds, or community clouds. Each cloud may permit the exchange of information and the provisioning of services among devices and/or applications that are connected to such clouds. Network 80 may include a wide area network, such as the Internet; a local area network, such as an intranet; a cellular network, such as a network using CDMA, GSM, 3G, 4G, LTE, or other protocols; a machine-to-machine network, such as a network using the MQTT protocol; another type of network; or some combination of the aforementioned networks. Network 80 may be a closed, private network, an open network, or some combination thereof and may facilitate wired or wireless communications of information among devices and/or applications connected thereto.

Network 80 may include a plurality of devices, which may be physical devices, virtual devices (e.g., applications running on physical devices that function similarly to one or more physical device), or some combination thereof. The devices within network 80 may include, for example, one or more of general purpose computing devices, specialized computing devices, mobile devices, wired devices, wireless devices, passive devices, routers, switches, mainframe devices, monitoring devices, infrastructure devices, other devices configured to provide information to and/or receive information from service providers and users, and software implementations of such.

In addition, network 80 may communicate with a plurality of mobile devices 120, such as cellular phones, tablets, laptops, and other portable devices. Mobile devices may each be associated with a cellular network provider. In some non-limiting embodiments of the present disclosure, all the mobile devices that send information to the signal data system 30 may be serviced on a singular cellular network provider. In other non-limiting embodiments, the mobile devices may be on multiple cellular network providers. Mobile devices 120 may be powered by a mobile operating system, such as Apple Inc.'s iOS® mobile operating system or Google Inc.'s Android® mobile operating system, for example. Mobile devices 120 also may determine their own GPS position information and provide such data to the signal data system 30 through direct communication or via the network 80. Mobile devices 120 may communicate with signal data system using a cellular network, such as 3G or LTE, for example, or other communication protocols or methods, such as Wi-Fi or NFC, for example. Further, mobile devices 120 may include one or more applications that provide a user interface, which may display alerts, alarms, and/or notifications disclosed herein, and which may provide one or more options for determining signal strength (e.g., requesting signal strength in an area, receiving an indication of low signal strength, receiving directions to an area of greater signal strength, etc.) identified in alerts, requests, and/or notifications. Signal strength, as referenced herein, may refer to signal of a network provider, a Wi-Fi network, or any other service provider.

The signal data environment may also include a database 90 which may include, for example, additional servers, data storage, and resources. Signal data system 30 may receive additional data from database 90. Signal data system 30 may also store signal data, account information, signal mapping, location information, and any information regarding signal data mapping or logging processes on the database 90. Database 90 may be any conventional database or data infrastructure. For example, database 90 may include scaled out data architectures (i.e., Apache Hadoop) and/or persistent, immutable stores/logging systems.

Figure 2:
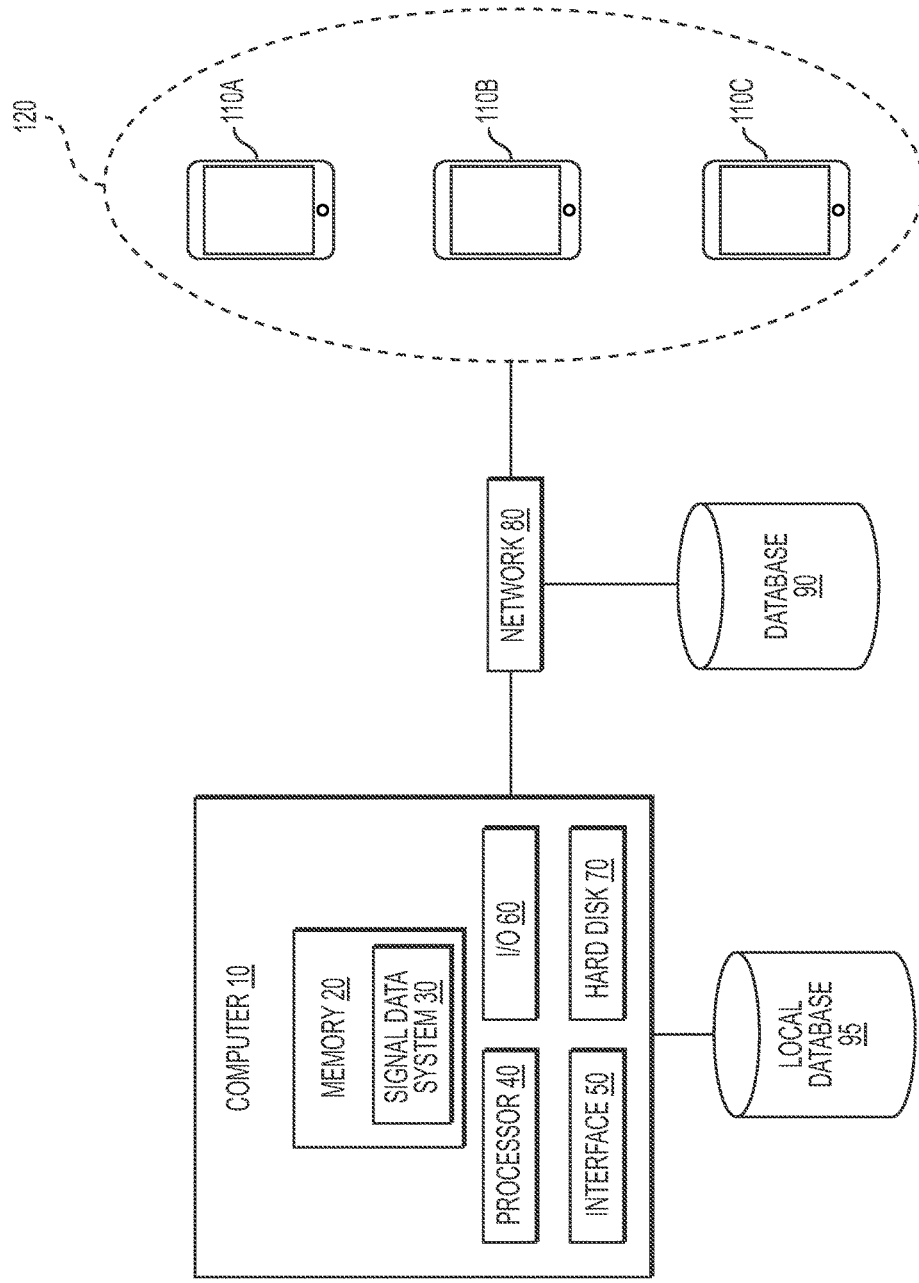
FIG. 2 is a schematic representation of a signal data system configured to determine a signal catalog indicative of reported signal strength information received from a plurality of mobile devices of a non-limiting embodiment of the present disclosure.

Referring to FIG. 2, the signal data system 30 of a non-limiting embodiment of the present disclosure is displayed. Computer 10 may reside on one or more networks. Computer 10 may comprise a memory 20, a central processing unit, an input and output ("I/O") device 60, a processor 40, an interface 50, and a hard disk 70. Memory 20 may store computer-readable instructions that may instruct computer 10 to perform certain processes. In particular, memory 20 may store a plurality of application programs that are under development. Memory 20 also may store a plurality of scripts that include one or more testing processes for evaluation of the applications. When computer-readable instructions, such as an application program or a script, are executed by the CPU, the computer-readable instructions stored in memory 20 may instruct the CPU to perform a plurality of functions. Examples of such functions are described below with respect to FIGS. 3-5. In some non-limiting embodiments of the present disclosure, the CPU may be a signal data system 30. In some implementations, when computer-readable instructions, such as an application program or a script, are executed by the signal data system 30, the computer-readable instructions stored in memory 20 may instruct the signal data system 30 to perform a plurality of functions.

I/O device 60 may receive one or more of data from network 80, local database 95, data from other devices and sensors connected to computer 10, and input from a user and provide such information to the signal data system 30. I/O device 60 may transmit data to network 80 or local database 85, may transmit data to other devices connected to computer 10, and may transmit information to a user (e.g., display the information, send an e-mail, make a sound). Further, I/O device 60 may implement one or more of wireless and wired communication between computer 10 or signal data system 30 and other devices within or external to network 80. I/O device 60 may receive one or more of data from another server or a network 80. The computer 10 may be a processing system, a server, a plurality of servers, or any combination thereof.

Signal data system 30 may be located on the cloud or on an external network. In some non-limiting embodiments, signal data system 30 may be partially located on a mobile device and partially on the cloud or a network, or any combination thereof. Furthermore, some non-limiting configurations of signal data system 30 may be located exclusively on a user's device, such as, for example a mobile device or tablet. Signal data system 30 may also be accessed by a user on a device such as any type of computing device, such as, for example, a mobile telephone.

Further referring to FIG. 2, mobile devices 120 may include a plurality of mobile devices such as mobile devices 110A, 110B, and 110C. Mobile devices 110A, 110B, and 110C may communicate with signal data system 30 directly or via network 80. In some non-limiting embodiments of the present disclosure, a mobile application may be installed on each of the mobile devices 120. The mobile application may constantly track and store signal strength data and corresponding location information of the mobile device. In some non-limiting embodiments, the mobile application on a mobile device may track, record, and report information to the signal data system 30. Location information may include GPS data, network location data, and/or latitude and longitude data. The signal strength data and corresponding location information may be uploaded to a cloud database, stored locally on the mobile devices 120, transmitted directly to the signal data system 30, or stored in any other database facility. In some non-limiting embodiments, mobile devices 110A, 110B, and 110C may store signal strength data and corresponding location information locally until reaching an area providing network access. In some non-limiting embodiments of the present disclosure, a mobile application may manage all signal strength data and corresponding location information on the mobile device. The mobile application may maintain an offline copy of all information. In some systems and methods of the present disclosure, signal data system 30 may rely on information in a cloud database where multiple mobile devices have uploaded signal strength data and corresponding location information.

Location information may include GPS data and cellular network base station triangulation data. In some non-limiting embodiments of the present disclosure, location of a mobile device may be determined via multilateration of radio signals between multiple cell towers of a network and the mobile device. The mobile device may emit at least the roaming signal to contact the next nearby antenna tower, but the process does not require an active call. Any other type of mobile phone location tracking, whether network-based, handset-based, SIM-based, Wi-Fi based, or hybrid based, is considered by the present disclosure.

Figure 3:
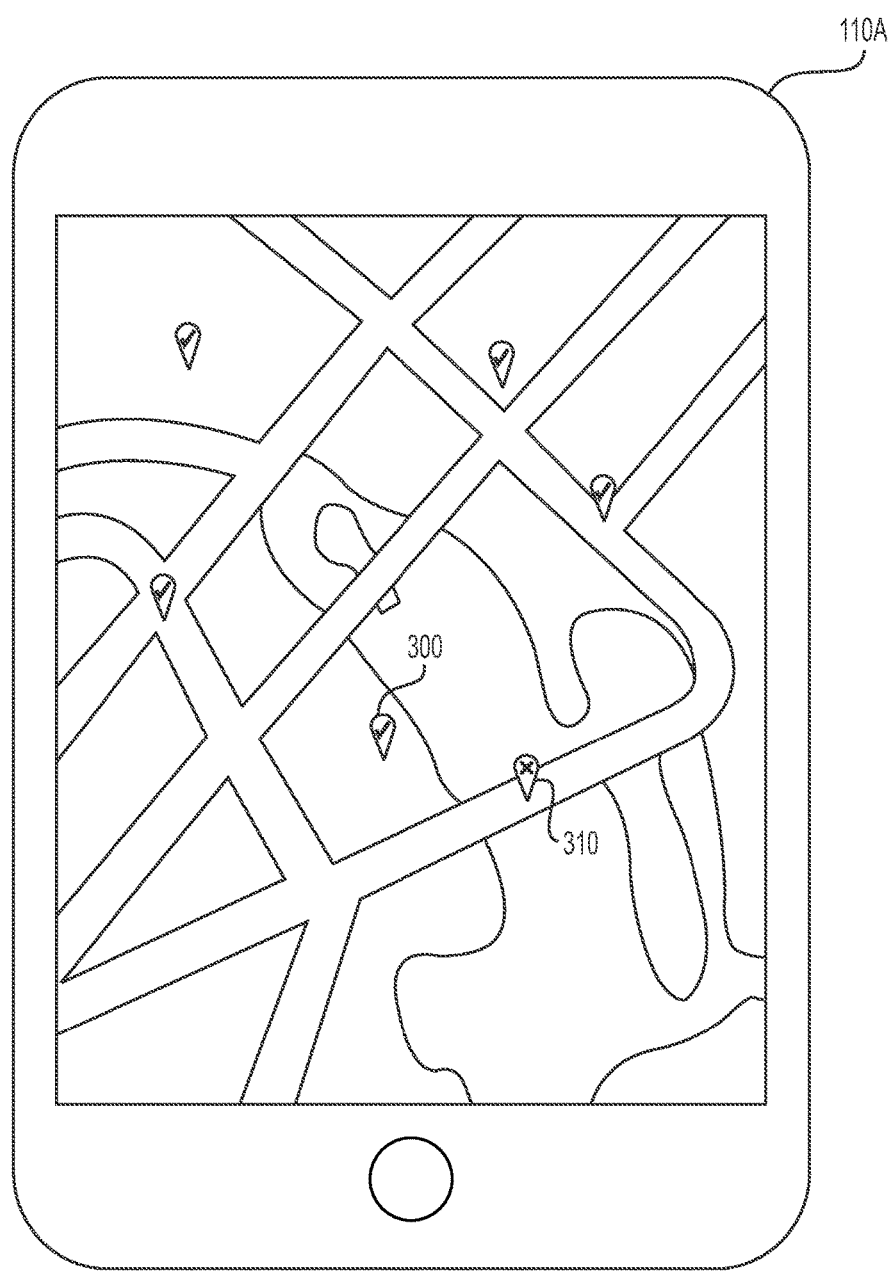
FIG. 3 illustrates a signal map on a mobile device of a non-limiting embodiment of the present disclosure.

FIG. 3 illustrates a signal map on a mobile device of a non-limiting embodiment of the present disclosure. Signal data system 30 may receive a plurality of signal strength and location data (e.g., through GPS position information) from multiple mobile devices. Signal data system 30 may generate a signal catalog indicative of reported signal strength at multiple locations. In addition, signal data system 30 may determine an average of reported signal strength at corresponding locations. The determined average signal strength may be overlaid on a map in multiple formats. In some non-limiting embodiments, markers indicating signal strength may be placed on a reference map such that the user may view areas of both weak and strong signal for a mobile device. Signal data system 30 may generate a signal map by overlaying the signal catalog on any type of map such as, for example, a general reference map. A signal map may be stored online, in the cloud, in a private/local network, in a public network, or in a local database of a mobile device for offline access. If provided for storage on the local database of the mobile device, the signal map may be updated periodically (e.g., at a predetermined time configured by signal data system 30) when the mobile device is in an area with service, signal, and/or Wi-Fi.

As shown in FIG. 3, indicators 300 and 310 may represent a single signal strength datum or an average of information reported from multiple mobile devices. Indicator 300 may represent an area determined by signal data system 30 to have strong signal based on reported information. A user of a mobile device 110A, for example, may travel to indicator 300 with confidence that there will be signal available for the mobile device 110A. Equally as useful, indicator 310 may represent an area determined by signal data system 30 to have low signal strength or no signal. A user of a mobile device 110A may rely on indicator 310 to avoid dropped calls or connection issues. Furthermore, a user may receive an indication on the mobile device 110A upon approaching an area of low service such as indicator 310. The indication may be configured to warn the user when the user is located within a predetermined distance of indicator 310 or when the user is determined to reach the area of indicator 310 within a predetermined amount of time. In some non-limiting embodiments of the present disclosure, signal data system 30 may provide any information to the mobile device at run time on the possibility of signal loss.

Figure 4:
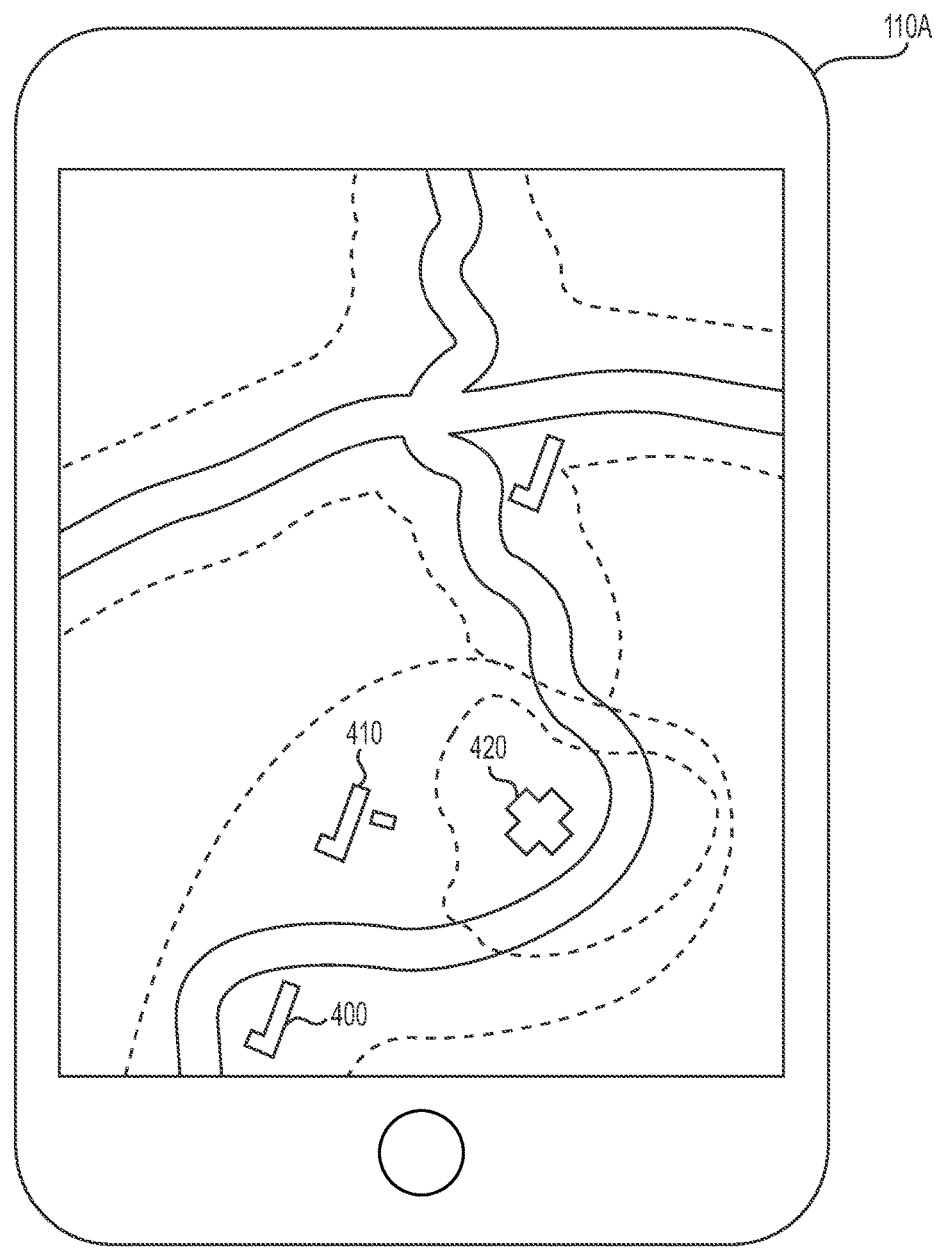
FIG. 4 illustrates a signal map on a mobile device of a non-limiting embodiment of the present disclosure.

In some non-limiting embodiments of the present disclosure, as depicted in FIG. 4, markers indicating signal strength may be placed on a reference map such that a user may view areas of both weak and strong signal for a mobile device. Indicator 400 may represent an area where average reported signal strength is strong, indicator 410 may represent an area where average reported signal strength is moderate, and indicator 420 may represent an area where the average reported signal strength is weak. A user of a mobile device may use this information in determining to take any action on a mobile device. Furthermore, as depicted in FIG. 4, boundaries around indicators 400, 410, and 420 may illustrate the extent of the respective signal strength. For example, the boundary surrounding indicator 420 may illustrate the area in which the average reported signal strength is weak or nonexistent. The boundaries shown in FIG. 4 may fluctuate as signal data system 30 receives additional reported signal strength from mobile devices of the community of users. As a result, a user of the mobile device may receive updated information and mapping.

Figure 5:
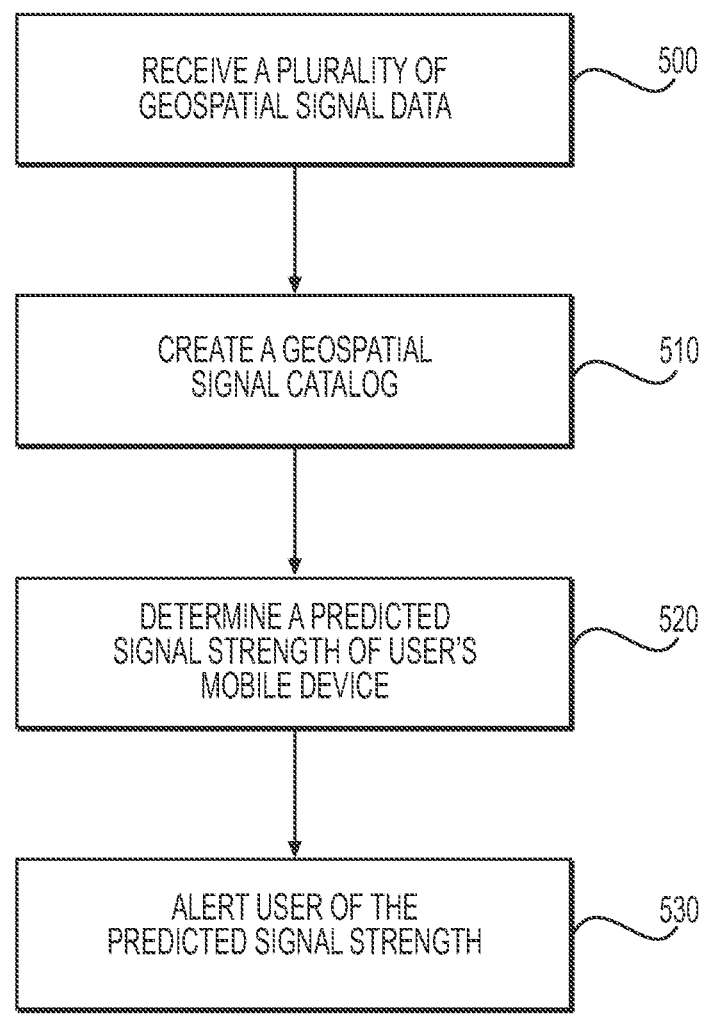
FIG. 5 is a flow chart for a method for determining a signal catalog and transmitting predicted signal strength in a non-limiting embodiment of the present disclosure.

Referring to FIG. 5, a signal data system 30 may receive a plurality of geospatial signal data including signal strength data and corresponding location information from a plurality of mobile devices, as indicated in step 500. This information may be transmitted from a mobile device directly to the signal data system 30 or via an intermediary channel. In addition, in some non-limiting embodiments of the present disclosure, this information may be transferred to the signal data system 30 on a delay. For example, if the mobile device does not have service or the ability to send the information to the signal data system 30 when collected, the mobile device may send the information when it regains service or the ability to do so.

Signal data system 30 may determine a signal catalog indicative of reported signal strength at each of a plurality of locations based on signal strength data and corresponding location information received from the plurality of mobile devices, as shown in step 510. In addition to signal strength data and corresponding location information, signal data system 30 may receive any other type of data from the mobile devices. For example, in some non-limiting embodiments of the present disclosure, signal data system 30 may receive data from a mobile device's accelerometer, web browser, or any other information produced or stored on the mobile device. In determining predicted signal strength, signal data system 30 may score each reported signal strength associated with the predicted location using a time-decay function based on an age of each reported signal strength.

Signal data system 30 may determine a predicted location of a particular mobile device at a future time based on location information received from the particular mobile device. Using the signal catalog and the predicted location of the particular mobile device, signal data system 30 may determine a predicted signal strength of the particular mobile device, as shown in step 520. Signal data system 30 may also compare the predicted signal strength to a signal threshold at the predicted location. The threshold may be predetermined or configured by the signal data system 30. In some non-limiting embodiments of the present disclosure, the threshold may indicate signal strength necessary to retain connection of an ongoing phone call using the mobile device. In response to determining that the predicted signal strength is below the threshold at the predicted location, signal data system 30 may transmit an indication to the particular mobile device indicating that the predicted signal strength is below the threshold. In some non-limiting embodiments, the signal data system 30 may determine, based on the predicted signal strength, that the particular mobile device will lose signal reception if it travels to the predicted location. In such a case, the signal data system may transmit the indication to the particular mobile device regarding the loss of signal reception.

In some non-limiting embodiments of the present disclosure, signal data system 30 may determine an average rate of change of signal based on reported signal strength at the predicted location of a particular mobile device. Signal data system 30 may determine a probability of losing signal strength of the particular mobile device while entering the predicted location based on the average rate of change of signal, and transmit the probability of losing signal strength to the particular mobile device.

In addition to determining the predicted signal strength of a particular device, signal data system 30 may determine a motion vector indicative of a velocity and a direction of travel of the particular mobile device based on the information received from the particular mobile device. The signal data system 30 may determine the motion vector by determining a velocity of the particular mobile device based on respective reporting times of each of the plurality of location information data points. Signal data system 30 may determine a predicted location of a mobile device based on the motion vector. In addition, signal data system 30 may, in some cases, assume that the user has the same location and predicted location as the user's mobile device.

Signal data system 30 may determine a target bearing for improving signal strength of a particular mobile device based on the signal catalog and the location information received from the particular mobile device. The target bearing may be transmitted to the particular mobile device over SMS protocol, over the cloud, over a data provider network, or any other communication channel. In some non-limiting embodiments of the present disclosure, a user of the particular mobile device may request the target bearing for its current location.

In step 530, signal data system may alert the user of the predicted signal strength of the particular mobile device by transmitting the predicted signal strength to the particular mobile device. This transmission may be over Short Message Service (SMS) protocol, via a notification on the mobile device, or via any other communication channel. In some non-limiting embodiments of the present disclosure, the signal data system 30 may notify or warn a user prior to the user entering an area of differing signal strength.

In some non-limiting embodiments of the present disclosure, signal data system 30 may determine a first location associated with a reported signal strength that is above a particular threshold. Signal data system 30 may rely on an average of many data points received from a plurality of mobile devices to determine the first location. In addition, signal data system 30 may initiate a data decay on any received information in order to give more credence to the most recently received data. Furthermore, signal data system 30 may also determine directions for navigating from the current location of the particular mobile device to the first location and transmit these directions to a particular mobile device. This transmission may occur over SMS protocol, via a data network, or any other communication channel. In some non-limiting embodiments of the present disclosure, a user may request such directions using his or her mobile phone. In addition, the threshold may be configured by the user or by the signal data system 30. Directions may be overlaid on any type of map and displayed on the mobile device. In some non-limiting embodiments, directions may include a compass or step by step instructions. Furthermore, signal data system 30 may suggest to the user another route to avoid an area of little to no service.

In other non-limiting embodiments of the present disclosure, signal data system may determine an area that a particular mobile device is likely to be in based on location information received from the particular mobile device. Signal data system 30 may transmit to the particular mobile device an average of reported signal strength for each of a plurality of locations. In addition, a user of a mobile device may request such information for any area from the signal data system 30. Moreover, the user may store the information locally on the mobile device. Furthermore, users may request signal status updates based on the predicted location of the mobile device.

For example, signal data system 30 may receive data from a particular mobile device of a user traveling in a vehicle along a highway. The received data may include signal strength data and corresponding location information for multiple points along the route. Signal data system 30 may use the multiple instances of location information to determine a motion vector of the particular mobile device indicative of a velocity and a direction of travel of the user. Signal data system 30 may also determine a predicted location of the user based on the received location information. Using the signal catalog, signal data system 30 may determine a predicted signal strength of the particular mobile device at the predicted location. In some non-limiting embodiments of the present disclosure, signal data system 30 may transmit the predicted signal strength to the particular mobile device, send a notification to the particular mobile device regarding the signal service in the predicted location, and/or send a suggested route to a location with stronger signal than the predicted location.

The flowcharts and diagrams in FIGS. 1-5 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, "each" means "each and every" or "each of a subset of every," unless context clearly indicates otherwise.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method, comprising:
   determining, using a processor, a predicted location of a particular mobile device at a future time based on location information received from the particular mobile device;
   determining, using the processor, a predicted signal strength of the particular mobile device at the predicted location, based on a signal catalog and the predicted location of the particular mobile device; and
   transmitting, using the processor, the predicted signal strength of the particular mobile device at the predicted location, to the particular mobile device.

2. The method of claim 1, wherein determining the predicted signal strength comprises:
   determining that the predicted signal strength is below a threshold at the predicted location; and
   transmitting an indication to the particular mobile device that the predicted signal strength is below the threshold at the predicted location.

3. The method of claim 1, wherein determining the predicted signal strength comprises:
   determining a motion vector indicative of a velocity and a direction of travel of the particular mobile device based on the location information received from the particular mobile device; and
   determining the predicted location based on the motion vector.

4. The method of claim 1, further comprising:
   determining a first location associated with a reported signal strength that is above a particular threshold;
   determining directions for navigating from a current location of the particular mobile device to the first location; and
   transmitting the directions to the particular mobile device.

5. The method of claim 1, further comprising:
   determining an area that the predicted location is in;
   transmitting an average reported signal strength at a plurality of locations within the area to the particular mobile device.

6. The method of claim 1, wherein determining the predicted signal strength comprises scoring reported signal strength associated with the predicted location from a plurality of mobile devices using a time-decay function based on an age of reported signal strength.

7. The method of claim 1, further comprising:
   generating a signal map by overlaying the signal catalog on a general reference map; and
   providing the signal map for storage in a local database of the particular mobile device for offline access by the particular mobile device.

8. The method of claim 7, further comprising:
   determining a target bearing for improving signal strength of the particular mobile device based on the signal catalog and the location information received from the particular mobile device; and
   transmitting the target bearing to the particular mobile device.

9. The method of claim 1, wherein the location information comprises global positioning system (GPS) data and cellular network base station triangulation data.

10. The method of claim 1, wherein the signal catalog is indicative of reported signal strength at each of a plurality of locations based on signal strength data and corresponding location information received from a plurality of mobile devices.

11. The method of claim 10, wherein the plurality of mobile devices are each associated with a cellular network provider.

12. A computer configured to access a storage device, the computer comprising:
   a processor; and
   a non-transitory, computer-readable storage medium storing computer-readable instructions that when executed by the processor cause the computer to perform:
      receiving a request from a particular mobile device for a predicted signal strength of a particular mobile device;
      determining the predicted signal strength of the particular mobile device at the predicted location, based on a signal catalog and a predicted location of the particular mobile device; and
      transmitting the predicted signal strength of the particular mobile device at the predicted location, to the particular mobile device, in response to the request.

13. The computer of claim 12, wherein determining the predicted signal strength of the particular mobile device in the predicted location comprises:
   determining a motion vector for the particular mobile device based on a plurality of location information data points received from the particular mobile device; and
   determining the predicted location based on the motion vector.

14. The computer of claim 13, wherein determining the motion vector comprises determining a velocity of the particular mobile device based on respective reporting times of a plurality of location information data points of a plurality of mobile devices.

15. The computer of claim 12, wherein the computer-readable instructions executable by the processor cause the computer to perform:

determining, based on the predicted signal strength, that the particular mobile device will lose signal reception if it travels to the predicted location; and transmitting an indication to the particular mobile device regarding the loss of signal reception.

16. The computer of claim 15, wherein the computer-readable instructions executable by the processor cause the computer to perform:

determining directions comprising a direction for improving signal strength of the particular mobile device based on the signal catalog and the location information received from the particular mobile device; and transmitting the directions to the particular mobile device.

17. The computer of claim 12, wherein the computer-readable instructions executable by the processor cause the computer to perform:

receiving a request from the particular mobile device for nearby locations to increase network service of the particular mobile device.

18. The computer of claim 17, wherein the computer-readable instructions executable by the processor cause the computer to perform:

determining a set of nearby locations, based on the signal catalog, with reported signal strengths that are higher than a currently reported signal strength of the particular mobile device; and transmitting the set of nearby locations to the particular mobile device.

19. The computer of claim 12, wherein determining a predicted signal strength further comprises determining whether any other networks provide signal coverage in the predicted location based on a respective signal catalog for each of the other networks.

20. A non-transitory computer-readable medium having instructions stored thereon that are executable by a computing system to perform operations comprising:

determining a predicted location of a particular mobile device at a future time based on location information received from the particular mobile device;

determining a predicted signal strength of the particular mobile device based on a signal catalog and the predicted location of the particular mobile device; and determining a signal target direction comprising a bearing for improving signal strength of the particular mobile device compared to the predicted signal strength, wherein the signal target direction is based on the signal catalog and the location information received from the particular mobile device;

transmitting information to display the signal map and the signal target direction on the particular mobile device.

* * * * *